United States Patent [19]

Gramann

[11] Patent Number: 4,574,479

[45] Date of Patent: Mar. 11, 1986

[54] PIZZA CUTTER

[76] Inventor: Hugh D. Gramann, 211 Chestnut Ridge Dr., Harland, Wis. 53029

[21] Appl. No.: 621,242

[22] Filed: Jun. 15, 1984

[51] Int. Cl.4 .............................................. A47J 43/28

[52] U.S. Cl. .......................................... 30/142; 7/113; 30/315; 294/7

[58] Field of Search ................. 30/123, 124, 172, 142, 30/315, 346, 356, 316; 294/7; 7/113

[56] References Cited

U.S. PATENT DOCUMENTS

| | | | |
|---|---|---|---|
| 382,591 | 5/1888 | Cowles | 294/7 X |
| 470,005 | 3/1892 | Mangin | 7/113 |
| 536,521 | 3/1895 | Hayes | 294/7 X |
| 695,966 | 3/1902 | Thomas | 294/7 |
| 1,723,507 | 8/1929 | Haertter | 7/113 |
| 2,641,496 | 6/1953 | Benezet | 294/7 X |
| 3,890,707 | 6/1975 | Cremonese | 30/340 |
| 4,423,551 | 1/1984 | Chmela | 30/142 |

FOREIGN PATENT DOCUMENTS

| | | | |
|---|---|---|---|
| 428123 | 4/1911 | France | 30/315 |

*Primary Examiner*—Jimmy C. Peters
*Attorney, Agent, or Firm*—Harvey B. Jacobson

[57] ABSTRACT

A cutting and serving implement for pizza or other pies comprises a blade having a body portion with an arcuate cutting edge, and a handle portion extending from the body portion opposite the cutting edge at an angle of about 135°. The configuration of the implement facilitates cutting of a pizza into slices by downward pressure applied on the handle accompanied by a rocking motion of the implement on the cutting edge, and lifting of a cut slice for serving, by insertion of the body portion under the slice.

1 Claim, 5 Drawing Figures

PIZZA CUTTER

BACKGROUND OF THE INVENTION

This invention relates to an implement which can be used expeditiously for cutting pizza and like pies, for example, into slices, and also for lifting the cut slices from a pan or the like for serving.

Traditional pizza cutters commonly comprise a rotary cutting wheel journalled on a handle. Because of the diameter of the wheel, e.g. about 2", difficulty may be encountered in cutting a close-fitting pizza crust right up to the edge of a pan in which it is prepared. Also, such cutters have no facility for lifting a cut slice from the pan. The present invention provides an alternative form of cutting implement intended, inter alia, to alleviate the above shortcomings associated with wheel-type cutters.

STATEMENT OF PRIOR ART

The following U.S. patents pertain to cutting implements and the like. None of these, however, discloses the features of the present invention.

U.S. Pat. Nos. 382,591; 1,110,946; 1,414,095; 2,624,938; 2,938,267; 3,890,707; 4,117,593.

SUMMARY OF THE INVENTION

The invention provides a cutting and serving implement for pizza or other pies and the like, comprising a blade of stainless steel or like sheet material having a body portion formed with a sharpened arcuate cutting edge on one side and a handle portion opposite the cutting edge which is bent in relation to the body portion, preferably at an angle of about 135°. With the body portion of the blade held vertically, the cutting edge can be used to cut through a pizza or the like by downward pressure on the handle portion accompanied by a rocking motion on the implement on the arcuate cutting edge. The sides of the blade may be shaped to provide narrow corners at the opposite ends of the cutting edge to facilitate cutting of a pizza right up to the edge of a baking pan in which it is prepared. Further, the configuration of the implement facilitates sliding of the body portion of the blade under a cut slice to remove same from the pan for serving.

The design of the implement lends itself to comfortable and natural handling, with the handle portion in an upright position, while providing efficient cutting with concentration of the cutting force on a small section of the arcuate cutting edge. Further, the angled handle portion promotes leverage for lifting of cut slices and may provide a convenient counterbalance. The handle portion may, for example, be provided with a wooden or like handle attachment.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF PREFERRED EMBODIMENT

The illustrated cutting and serving implement 10 for pizza and the like comprises a blade 12, preferably of stainless steel sheet about 0.048" thick, and a wooden or like handle attachment 14.

Figure 2:
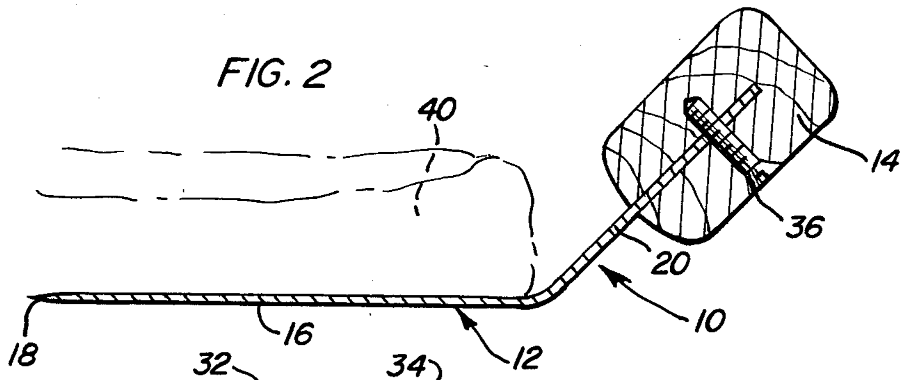
FIG. 2 is an enlarged sectional view on line 2—2 of FIG. 1.
Figure 4:
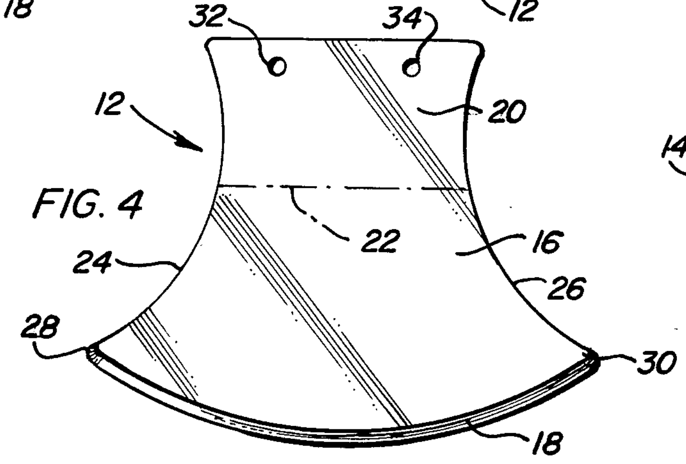
FIG. 4 is a plan view of the blade of the implement.
Figure 5:
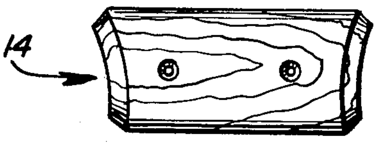
FIG. 5 is an elevational view of a handle attachment for the implement.

Blade 12 has a body portion 16 with a sharpened arcuate cutting edge 18, and a handle portion 20 opposite the cutting edge, the handle portion being bent up along line 22 at about 135° to the body portion. The blade has concave sides 24, 26 defining narrow radiused corners 28, 30 at the opposite ends of the cutting edge. Handle portion 20 has holes 32, 34 for attachment of handle member 14 by means of attachment screws 36, as shown in FIG. 2. The handle member is suitably slotted for this purpose.

Typically, cutting edge 18 may have a radius of about 6" and its chordal length corner-to-corner may be about $7\frac{1}{8}$". The overall length of body portion 16 from the apex of the cutting edge to the bend line 22 may be about $4\frac{1}{2}$". The width of the handle portion may be about 1 15/16". The radius of each concave side 24, 26 of the blade may be about 3", and the radius of each of the corners 28, 30 about $\frac{1}{8}$". The length of the handle member may be about $3\frac{7}{8}$".

Figure 1:
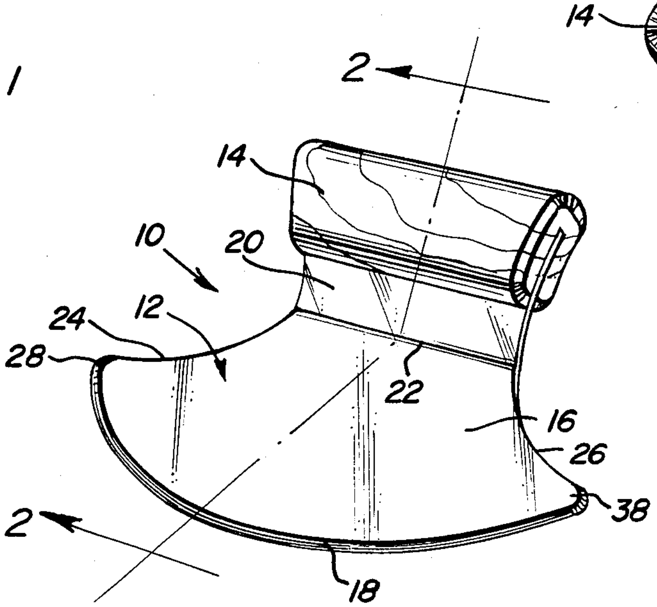
FIG. 1 is a perspective view of a cutting and serving implement in accordance with the invention.
Figure 3:
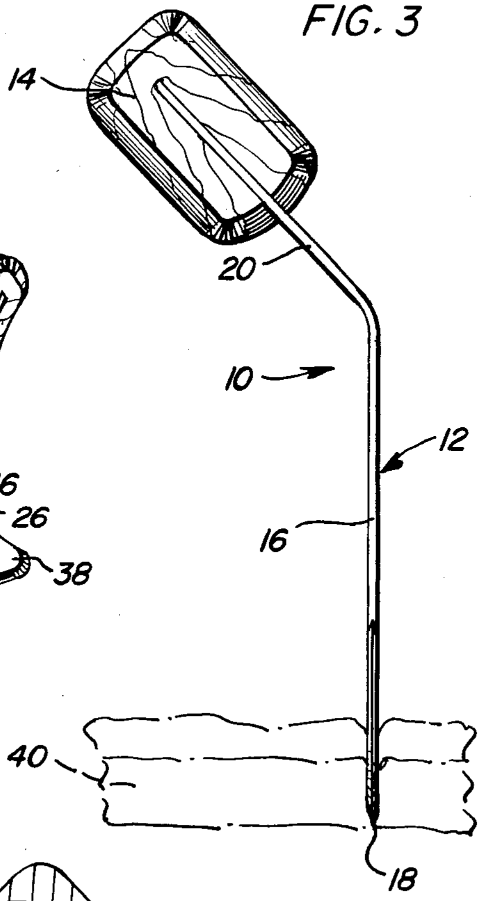
FIG. 3 is an enlarged end view of the implement in upright cutting position.

The implement may be used to cut slices from a pizza 40 or the like as shown in FIG. 3, by applying downward pressure on the cutting edge while gripping the handle, accompanied by a progressive rocking movement of the implement on the cutting edge. The implement may then be used to lift and serve cut slices of the pizza by insertion of the blade thereunder, as shown in FIG. 2. As previously noted, the bent configuration of the implement aids in user comfort and facilitates manipulation both in the cutting and serving operations.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cutting and serving implement for pizza or other pies and the like comprising a blade having a planar body portion with a sharpened arcuate cutting edge, and a handle portion extending from the body portion opposite the cutting edge at an obtuse angle for facilitating cutting of a pizza or the like by downward pressure applied on the handle portion accompanied by a rocking motion of the implement on the cutting edge, and lifting of a cut slice of the pizza or the like by insertion of the body portion under the slice, the handle portion of the blade being bent up from the body portion, at an obtuse angle of about 135 degrees, about a bend line, the width of the body portion from an apex point of the cutting edge to the bend line being greater than the width of the handle portion from the bend line to a terminal edge of the handle portion, the implement having an elongate handle attachment on said terminal edge of the handle portion, the handle attachment extending substantially in parallel with the the bend line, and the blade having concave sides adjacent the cutting edge providing narrow corners at opposite ends of the cutting edge to allow cutting of a pizza or the like up to an edge of a pan in which the pizza or the like is prepared.

* * * * *